Patented Feb. 3, 1942

2,271,782

UNITED STATES PATENT OFFICE 2,271,782

VULCANIZATION OF RUBBER

Arthur W. Sloan, Akron, Ohio, assignor to The B. F. Goodrich Company, New York, N. Y., a corporation of New York No Drawing. Application December 4, 1937, Serial No. 178,111

14 Claims. (Cl. 260—785)

The present invention relates to the vulcanization of rubber and rubber-like materials, and to improvements in the process of vulcanization.

Of the large number of accelerators of vulcanization which have found useful application, none has been universally applicable, so great and varied are the demands made upon them. It has been found possible to improve the vulcanizates which can be obtained by the use of accelerators by using them in combination with other materials which may be called activators of the accelerators. These materials of themselves may be mild accelerators, but in general they have little accelerating power when used alone.

I have found that an especially useful type of activator is that comprising the class of primary 2-amino thiazoles, such as 2-amino thiazole, 2-amino 4-methyl thiazole, 2-amino 4-ethyl thiazole, 2-amino 4.5 dimethyl thiazole, 2-amino 4-phenyl thiazole, 2-amino 4-p-ethoxyphenyl thiazole, 2-amino 4-phenyl 5-methyl thiazole, 2-aminobenzothiazole, 2-amino 4 methyl benzothiazole, 2-amino 6-methoxy benzothiazole, 2-amino alpha-naphthothiazole, 2-amino beta-naphthothiazole, and 2.2' diaminobenzodithiazole. These compounds all have the general structure represented by the following formula:

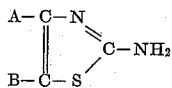

in which A and B represent hydrogen or aliphatic or aromatic radicals or a bivalent radical forming with the two adjacent C atoms a homocyclic ring. Those compounds in which A and B unite to form an aromatic ring fused with the thiazole ring, such as benzothiazole, naphthothiazole, etc., are frequently called for convenience "arylene-thiazoles". The corresponding amino oxazoles, in place of amino thiazoles, are likewise useful.

None of these materials has heretofore been suggested as an activator for accelerators of vulcanization. One of them has been tried as an accelerator, but with negative results. For example, Sebrell (Ind. and Eng. Chem. 15, 1013 (1923)) compared 2-aminobenzothiazole as an accelerator, with 2-mercaptobenzothiazole, and found the amino benzothiazole to be a very weak accelerator. Nevertheless the primary 2-amino thiazoles are very effective in increasing the activity of other active accelerators of vulcanization.

I have also found that certain of the aminothiazoles, i. e. those in which the thiazole ring is not fused with an aromatic ring such as a benzene ring, are active accelerators in their own right. This is all the more surprising when it is considered that Sebrell, in the article referred to above, concluded that omission of the benzene ring of mercaptobenzothiazole, or substitution of an amino group for the mercapto group, greatly diminished the activity of the compound. It now appears that both changes when made concurrently, instead of having a cumulative effect in diminishing activity, actually restore the accelerating power of the compounds.

These materials can be made in a variety of ways, for example by reacting the corresponding 2-chlorderivative with ammonia preferably at an elevated temperature, with or without a diluent such as benzene or alcohol. They may also be made by reacting alpha chlor substituted ketones or aldehydes with thiourea. Phenacyl chloride, for example, reacts readily with thiourea in aqueous suspension or in alcohol solution to form 2-amino 4 phenyl thiazole. Amino benzo thiazole can be formed in good yield by reacting an excess of ammonia with 2 chlorbenzothiazole in methyl alcohol solution, under pressure at an elevated temperature. It can also be formed by oxidizing mono-phenyl thiourea in benzene with an oxidizing agent such as chlorine or bromine, with subsequent neutralization of the acid formed in the reaction.

Other amino thiazoles have been prepared, largely for use as dye intermediates, by the above or other methods, and may be found described in British Patent 295,295; British Patent 347,141; French Patent 688,867; German Patent 537,105; and United States Patents 1,787,315; 1,787,316; and 1,788,297.

The following examples are given of the use of certain of these amino thiazoles in rubber vulcanization where mercaptobenzothiazole is used as the accelerator.

In a rubber composition containing rubber 100 parts, zinc oxide 8 parts, channel carbon black 45 parts, sulfur 3 parts, pine tar 5 parts, phenyl beta naphthyl amine 0.75 part, and 2-mercaptobenzothiazole 0.5–0.9 part as indicated, the addition of the amino thiazoles listed in the table below had the effects noted in the table, on the rate of cure at 220° F. and at 265° F., and on the aging in an oxygen bomb for 96 hours at 70° C. and 300 lbs. of oxygen pressure.

| Mercapto benzo thiazole | Amino thiazole | Tensile in 60′ @ 220° F. | Tensile of optimum cure @ 265° F. | Tensile after bomb aging |
|---|---|---|---|---|
| 0.9 | None | No cure | 105′ 3,490 | 2,075 |
| 0.9 | 0.2 2-aminobenzothiazole | ---do--- | 75′ 4,040 | 2,400 |
| 0.9 | 0.4 2-amino 4,5-dimethyl-thiazole. | Slight cure | 60′ 4,510 | 3,025 |
| 0.7 | 0.4 2-amino 4,5-dimethyl thiazole. | Very slight cure | 45′ 4,420 | 2,940 |
| 0.9 | 0.2 2-aminothiazole | No cure | 60′ 4,200 | 2,900 |
| 0.5 | 0.4 2-aminothiazole | ---do--- | 60′ 4,375 | 2,300 |
| 0.9 | 0.2 2-amino 4-ethylthiazole | ---do--- | 60′ 4,040 | 2,750 |
| 0.9 | 0.4 2-amino 4-phenylthiazole | ---do--- | 75′ 3,820 | 2,780 |

It will be noted that the rate of vulcanization has been increased by the addition of the aminothiazole and that by its use, the amount of accelerator can be reduced without lowering the rate of vulcanization; also that the ultimate tensile strength of the rubber is increased, that the increased rate of vulcanization and improved tensile strength are accomplished without increasing the "scorchiness" of the rubber mixture—i. e. the tendency to precure as reflected by the rate of vulcanization at 220° F.—and that the vulcanizates containing the aminothiazoles age better in the Bierer-Davis bomb at 70° C. under 300 lbs. oxygen pressure than do the vulcanizates lacking the amino thiazoles. Similar results are secured with other mercaptothiazoles, particularly the mercapto alkylthiazoles such as 2-mercapto 4,5 dimethyl thiazole.

Other active accelerators, such as the esters of mercaptobenzothiazole, the aldehyde-amines, the guanidines and the thiurams (salts, esters, sulfides, etc.) are likewise activated by these materials, but in general the so-called basic accelerators such as the guanidines and aldehyde-amines are less sensitive to their presence than the so-called acidic type of accelerator including the mercaptothiazoles, as well as other mercapto-substituted organic bases such as mercapto-quinoline, and the accelerating thio acids such as dithiobenzoic acid, xanthogenic acids, dithiocarbamic acids and the like, and salts, esters, acid anhydrides, disulfides, and other derivatives of the types well known to be active accelerators of vulcanization, of any of them.

These amino thiazoles in which the thiazole ringe is not fused with an aromatic ring are useful alone as accelerators. For example, 2-amino thiazole, 2-amino 4-methyl thiazole, 2-amino 4-ethyl thiazole, and 2-amino 4,5-dimethyl thiazole are accelerators of moderate activity as indicated by the following data:

A rubber composition containing rubber 100 parts, zinc oxide 10 parts, sulfur 3.5 parts, barytes 20 parts, and 2-aminothiazole 1 part, when vulcanized for 90 min. at 287° F. gave a vulcanizate having a tensile strength of 3455 lbs./sq. in. and an ultimate elongation of 700%.

In contrast with this result, a rubber composition containing rubber 100 parts, zinc oxide 10 parts, sulfur 4 parts, and anilinobenzothiazole 1 part, when vulcanized for 90 min. at 287° F. gave a vulcanizate having a tensile strength of only 1465 lbs./sq. in., and an ultimate elongation of 965%, indicating that very little cure had taken place.

By replacing the anilinobenzothiazole with 2-aminobenzothiazole, a tensile strength of 1890 lbs./sq. in., and an ultimate elongation of 880% were obtained.

The generic term a rubber is meant to designate generally rubbery materials susceptible of vulcanization with sulfur, such as caoutchouc, abalata, gutta percha, natural or artificially prepared latex, and synthetic rubber.

It is to be understood that the activators may be used in admixture with antioxidants, softeners, pigments, fillers, etc.; and that the rubber may be vulcanized with the assistance of this new class of activators in other manners than that particularly set forth above; specifically, it may be vulcanized in hot air, steam, hot water, etc. The activators may be advantageously employed in small proportions, usually not more than 1% of the rubber in the compositions. Amounts as high as 5% or over may be used, however.

For the purposes of this patent, the two isomeric formulas

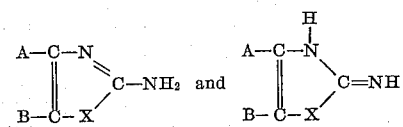

are considered as being equivalent or identical.

The scope of this invention is not to be limited to the specific examples herein set forth, but is to be limited only as required by the prior art and as indicated in the appended claims.

I claim:

1. The process of vulcanizing a rubber in the presence of an active accelerator of vulcanization of the acidic type and as an activator therefor a primary 2-amino thiazole.

2. The process of vulcanizing a rubber in the presence of an active accelerator of vulcanization of the acidic type and as an activator therefor 2-amino benzothiazole.

3. The process of vulcanizing a rubber in the presence of 2-mercapto benzothiazole and as an activator therefor 2-amino benzothiazole.

4. The process of vulcanizing a rubber in the presence of a primary 2-amino thiazole in which the thiazole ring is not a part of a fused ring system.

5. The process of vulcanizing a rubber in the presence of a primary 2-amino alkyl-substituted thiazole.

6. The process of vulcanizing a rubber in the presence of an active accelerator of vulcanization of the acidic type and as an activator therefor a primary 2-amino thiazole in which the thiazole ring is not a part of a fused ring system.

7. The process of vulcanizing a rubber in the presence of an accelerating mercapto heterocyclic base and as an activator therefor a primary 2-amino thiazole.

8. The process of vulcanizing a rubber in the presence of a 2-mercaptothiazole and as an activator therefor and a primary 2-amino thiazole.

9. The process of vulcanizing a rubber in the presence of a 2-mercaptothiazole and as an activator therefor 2-aminothiazole.

10. The process of vulcanizing a rubber in the presence of a 2-mercapto alkylthiazole and as an activator therefor 2-amino alkylthiazole.

11. A rubber composition comprising a rubber which has been vulcanized in the presence of an active accelerator of vulcanization of the acidic type and as an activator therefor a primary 2-amino alkyl thiazole.

12. A rubber composition comprising a rubber which has been vulcanized in the presence of a primary 2-amino thiazole in which the thiazole ring its not a part of a fused ring system.

13. A rubber composition comprising a rubber which has been vulcanized in the presence of a 2-mercapto alkylthiazole and as an activator therefor a primary 2-amino thiazole.

14. A rubber composition comprising a rubber which has been vulcanized in the presence of a 2-mercapto alkylthiazole and as an activator therefor 2-amino alkylthiazole.

ARTHUR W. SLOAN.

CERTIFICATE OF CORRECTION.

Patent No. 2,271,782.  February 3, 1942.

ARTHUR W. SLOAN.

It is hereby certified that error appears in the printed specification of the above numbered patent requiring correction as follows: Page 2, first column, line 50, for the word "These" read --Those--; line 51, for "ringe" read --ring--; and second column, line 17, for "abalata" read --balata--; line 74, claim 8, strike out "and" after "therefor"; page 3, second column, line 3, claim 12, for "its" read --is--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents,